May 6, 1958
L. L. CUMMINGS
2,833,306
CHECK VALVE
Filed June 10, 1955
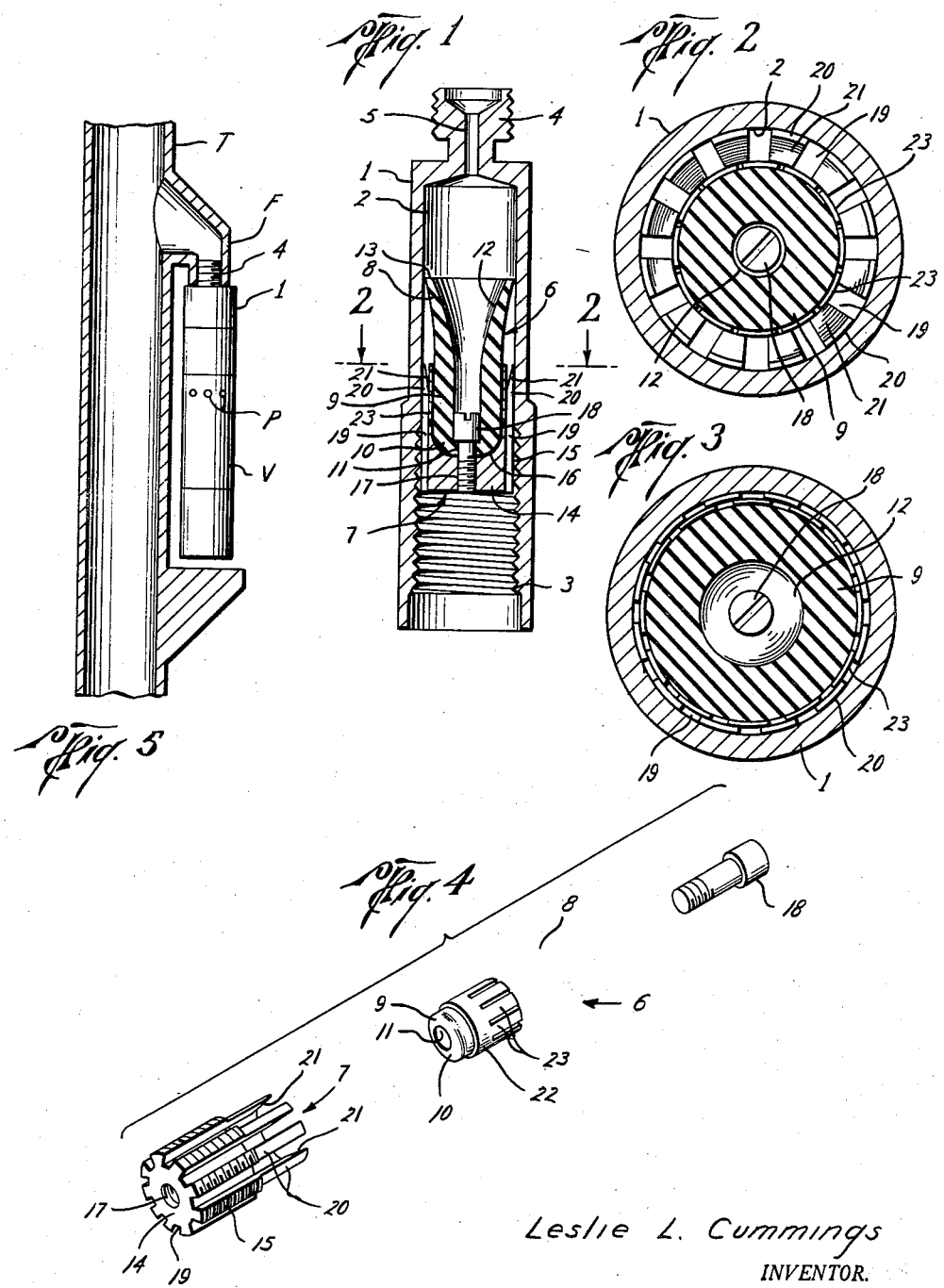
Leslie L. Cummings
INVENTOR.
BY
ATTORNEY

United States Patent Office 2,833,306
Patented May 6, 1958

2,833,306

CHECK VALVE

Leslie L. Cummings, Houston, Tex., assignor, by mesne assignments, to Otis Engineering Corporation, Dallas, Tex., a corporation of Texas Application June 10, 1955, Serial No. 514,427

7 Claims. (Cl. 137—525)

This invention relates to a check valve.

Check valves are commonly employed in fluid flow systems to permit flow in one direction while preventing flow in the opposite direction. Most forms of check valves employ metal-to-metal closure and seat elements which, in many types of service, and particularly where frequent and rapid reversals of flow occur, are subject to high rates of wear, erosion, and other operational difficulties, which result in leakage and often rapid destruction of the valve.

Check valves employing seats or closures, or both, which are constructed of flexible non-metallic materials such as rubber or similar resilient compositions, have heretofore been employed and possess advantages over metallic seat and closure constructions in many types of service, but are themselves subject to various difficulties, particularly when subjected to high fluid pressures. Under high pressures the resilient composition material is subject to plastic flow and extrusion through crevices and orifices in the seating and encasing elements which cause leakage and often destruction of the valve.

Accordingly, the present invention has for its primary object the provision of an improved form of check valve employing a closure element of flexible resilient composition material which obviates or eliminates the principal disadvantages to which more conventional check valves are subject, particularly when employing resilient materials as the valving elements.

Another object is to provide a check valve employing a hollow resilient cup-shaped closure element, and metallic support and seating elements adapted to prevent destructive plastic flow and extrusion of the closure material under pressure.

A more specific object is to provide a check valve of the general character described which is particularly adapted for use in oil well gas-lift systems.

Other and more specific objects and advantages of this invention will become more readily apparent from the following detailed description when read in conjunction with the accompanying drawing which illustrates one useful embodiment in accordance with this invention.

In the drawing:

Fig. 1 is a longitudinal sectional view of a check valve in accordance with one embodiment of this invention;

Fig. 2 is a cross-sectional view taken generally along line 2—2 of Fig. 1, showing the positions of the valve parts in open or fluid-passing position;

Fig. 3 is a view similar to Fig. 2 showing the valve parts in the closed position;

Fig. 4 is an exploded perspective view of the parts forming the check valve assembly; and Fig. 5 shows the check valve installed as a part of a gas lift valve structure in a well.

Referring to the drawing, the valve in accordance with an illustrative embodiment of this invention, comprises the generally tubular casing 1 having the bore 2 provided internally with threads 3 in one end portion and provided at the other end with the externally threaded pin member 4. The latter has an axial bore 5 communicating with bore 2.

Mounted in bore 2 is the check valve assembly comprising a closure element, designated generally by the numeral 6 and the seating and support element, designated generally by the numeral 7.

Closure element 6 comprises a hollow cup-shaped structure constructed of flexible, resilient composition material, such as natural or artificial rubber or rubber-like plastic, and includes a hollow radially flaring frustoconical or bell-shaped section 8 merging at its smaller end into, and integrally formed with, an axially straight section 9 which terminates in a convexly rounded end wall 10, having an axial opening 11 therethrough communicating with the bore 12 of the closure element. The wall thickness of flared section 8 is taperingly reduced toward the mouth or outer end of the section to form the relatively thin flexible annular lip 13 at the outer end of the flared section which is normally in light frictional contact with the wall of bore 2 of the casing.

The seating and support element 7 comprises a generally cylindrical seat plug 14 having threads 15 on the exterior thereof complementary to threads 3 in casing 1 whereby the seat plug may be threadedly inserted into the casing. The upper end of seat plug 14 is provided with a concave recess 16 complementary in shape to rounded end wall 10 on the closure element whereby to provide a receptacle adapted to receive and snugly seat the rounded end of the closure element. Seat plug 14 is provided with an internally threaded axial opening 17 adapted to register with opening 11 in the closure element. A stud 18 is inserted from bore 12 through opening 11 and screwed into threaded opening 17 to secure the closure element to the seat plug. The exterior of the seat plug is provided with a plurality of parallel, circumferentially spaced longitudinally extending grooves or slots 19 which are adapted to form fluid passages between the seat plug and the bore wall of casing 1 to permit flow of fluid through the casing when the valve is open, as will appear more fully hereinafter.

Disposed about the inner end periphery of seat plug 14 is a plurality of longitudinally extending, circumferentially spaced ribs 20 which are integral with seat plug 14, the spaces between the ribs registering with slots 19 to form continuations of the fluid passageways defined thereby. The length of ribs 20 is made such that their free ends terminate approximately opposite the juncture of flared section 8 with straight section 9 of the closure element. The inner faces of the outer end portions of ribs 20 are outwardly tapered or bevelled at 21 for purposes to be described more fully hereinafter. Ribs 20 form segments of a ring or collar carried by the inner end of seat plug 14 surrounding section 9 of the closure element and forming an extension of the receptacle for closure element 6 defined by recess 16. The inner diameter of the circle formed by ribs 20 is made slightly greater than the external diameter of section 9 of the closure element. The latter has mounted about its exterior a thin resilient metal collar 22 which embraces or surrounds a substantial portion of the length of section 9. Collar 22 is longitudinally split at a plurality of circumferentially spaced points, the splits extending from the end of the collar nearest flared section 8 to points spaced from the opposite end of the collar, whereby to define a plurality of longitudinally extending resilient fingers 23 disposed about the exterior of section 9 of the closure element. Collar 22 may be slipped over section 9 or may be molded or vulcanized to the material forming section 9 of the closure element, being adapted to resiliently expand and contract with the radial expansion and contraction of the closure element.

It will be understood that the number of the fingers 23, their spacing and their width will be selected in relation to the number and width of the spaces between the ribs 20 so that when closure element 6 is inserted into the receptacle formed by recess 16 and ribs 20 and properly angularly oriented or rotated therein, there will be mutual over-lapping of the ribs 20 and fingers 23 whereby ribs 20 will span and cover the spaces between fingers 23 and the latter will span and cover the spaces between the ribs 20, as illustrated particularly in Fig. 2.

In operation, the check valve assembly comprising closure element 6, seat plug 8 and stud 18 will be assembled and inserted into casing 1, seat plug 14 being screwed into threads 3 to the desired extent but sufficient to place lip 13 opposite a smooth portion of the wall of bore 2 and to leave the outer end portion of the section of thread 3 available for connecting this end of the casing into a fluid conduit system. Threaded pin member 4 will provide the means for connecting the other end of the casing into the conduit system. The check valve, as so installed, will freely pass fluid in the direction indicated by the arrow in Fig. 2, the fluid entering bore 2, passing around seat plug 14 through the passages formed by slots 19 and thence between closure element 6 and the wall of bore 2 of the casing, the lip 13 being caused to flexibly contract sufficiently to allow the fluid to pass the closure element. The fluid then is discharged from casing 1 through passageway 5.

When fluid under pressure attempts to flow back through casing 1, it will enter the bore of the closure element and its pressure will be exerted against the wall thereof, radially expanding the closure element into annular fluid-tight compressive engagement with the wall of bore 2, to thereby effectively prevent reverse flow of fluid through the valve. The expansion of the wall of the closure element will bend the free ends of fingers 23 radially outwardly and cause them to snugly engage the inner walls of ribs 20 and tapered faces 21 thereof, the fingers and ribs mutually over-lapping the respective spaces between them whereby to effectively seal such spaces sufficiently to prevent plastic flow and extrusion therethrough of the plastic material forming the closure elements. The expanded positions of the parts are illustrated in Fig. 3.

When reverse flow pressure is relieved from the closure element, the resilience of the material forming the closure element aided by the resilience of the spring metal fingers 23 will cause the closure element and fingers 23 to retract to their original positions whereby to again permit free flow of fluid through the valve.

By means of the construction herein described, a check valve is provided which will form an effective seal against high pressures and which may be open and closed repeatedly and rapidly without fatigue and which is highly resistant to erosion, corrosion, battering and other conditions to which check valves are often subject.

Fig. 5 illustrates one useful application of the check valve in accordance with the present invention, namely, in a gas lift installation for artificial gas lift pumping of an oil well. The check valve is shown mounted on the upper end of a conventional gas lift valve V having ports P through which lifting gas is passed. The upper connection 4 of the check valve is shown screwed into the usual inlet fitting F mounted to communicate with the interior of a well tubing T. In this installation the check valve will effectively prevent back flow of fluid from the interior of tubing T to the exterior thereof.

It will be understood that check valves in accordance with this invention may be employed in many other fluid conduit systems where the use of a check valve is ordinarily indicated or required.

It will be understood that various alterations and modifications may be made in the details of the illustrative embodiment within the scope of the appended claims but without departing from the spirit of this invention.

What I claim and desire to secure by Letters Patent is:

1. A check valve, comprising, a tubular casing, a plug member mounted in the bore of the casing, a cup-shaped closure member constructed of flexible resilient material having one end closed, the closed end being seated against the inner end of said plug member, a plurality of circumferentially spaced ribs extending from the inner end of said plug member about the adjacent portion of said closure member, a plurality of flexible metal fingers mounted about the exterior of the closure member in circumferentially spaced relation, said fingers and said ribs being relatively angularly oriented to mutually over-lap their respective intervening spaces, and said plug member having one or more fluid passages extending longitudinally entirely therethrough.

2. A check valve, comprising, a tubular casing, a plug member removably mounted in the bore of the casing, a plurality of annularly arranged, circumferentially spaced rib members extending longitudinally from the periphery of the inner end of said plug member, a generally tubular closure member constructed of flexible resilient material having one end closed and inserted between said rib members in seating engagement with the inner end of said plug member, the opposite end of said closure member having outwardly flaring shape and extending beyond the confines of said rib members, a plurality of resilient metal fingers mounted on the exterior of the portion of said closure member inserted between said ribs, said fingers being circumferentially spaced and positioned to overlap and close the spaces between said rib members, and said plug member having a plurality of fluid passages extending longitudinally therethrough.

3. A check valve, comprising, a tubular casing having an axial bore, a cylindrical plug member removably mounted in said bore, said plug member having a plurality of fluid passages extending longitudinally therethrough, a plurality of annularly arranged, circumferentially spaced ribs extending longitudinally from the inner end of the plug member about its periphery, a hollow generally tubular closure member constructed of flexible resilient material having one end closed and inserted between said ribs into seating engagement with the inner end of said plug member, the opposite end of said closure member being of outwardly flaring shape and extending axially beyond the confines of said ribs, and a plurality of circumferentially spaced resilient metal fingers mounted on the exterior of said closure member in overlapping relation to the spaces between said ribs.

4. A check valve, comprising, a tubular casing, a cylindrical plug member removably mounted in the bore of the casing, said plug member having a plurality of circumferentially spaced longitudinal channels in the exterior thereof to provide fluid passageways between the plug member and the bore wall of the casing, a concave recess in the inner end of said plug member, a plurality of upstanding circumferentially spaced ribs arranged about the periphery of said recess, a hollow closure member constructed of flexible resilient material seated in said recess, said closuure member including an outwardly flaring cup-shaped section annularly expandible by internal pressure into sealing engagement with the bore wall of said casing and an axially straight portion receivable in said recess and closed at its inner end, and a collar member mounted about the exterior of the axially straight portion of said closure member, said collar member comprising a plurality of circumferentially spaced resilient metal fingers, said fingers and said ribs being relatively angularly oriented to overlap and close their respective intervening spaces.

5. A check valve, comprising, a tubular casing, a cylindrical plug member threadedly insertible in the bore of the casing, said plug member having a plurality of circumferentially spaced grooves in the exterior surface thereof extending longitudinally from end to end thereof, a plurality of annularly arranged, circumferentially spaced rib members extending longitudinally from the periphery of the inner end of said plug member, a concave recess in the inner end of the plug member enclosed by said rib members, a hollow generally tubular closure member constructed of flexible resilient material and comprising a frusto-conical outer end portion and an axially straight portion closed at its inner end, said axially straight portion being inserted between said rib members with said closed inner end seated in said recess, a resilient metal collar mounted about said axially straight portion, said collar member being split at a plurality of circumferentially spaced points from its outer end to a point spaced from its inner end whereby to form a plurality of circumferentially spaced flexible metal fingers, said fingers being angularly positioned to close the spaces between said rib members.

6. A check valve as defined by claim 5, wherein the outer end portions of said rib members have outwardly tapered inner faces.

7. A check valve for installation in an enclosing tubular casing, comprising, a plug member insertible in the bore of the casing, a cup-shaped closure member construced of flexible resilient material having one end closed, the closed end being seated against an end of said plug member and secured thereto, a plurality of circumferentially spaced ribs extending from said end of the plug member longitudinally about the adjacent portion of said closure member, a plurality of flexible metal fingers mounted about the exterior of the closure member in circumferentially spaced relation, said fingers and said ribs being relatively angularly oriented to mutually overlap their respective intervening spaces, and said plug member having one or more fluid passages extending longitudinally entirely therethrough and communicating with the spaces between said fingers.

References Cited in the file of this patent

UNITED STATES PATENTS

| | | |
|---|---|---|
| 2,329,960 | Verheul | Sept. 21, 1943 |
| 2,624,889 | Cummings | June 23, 1953 |
| 2,651,322 | Hendry | Sept. 8, 1953 |
| 2,671,466 | Conrad | Mar. 9, 1954 |